(12) United States Patent  
Ramakrishna et al.

(10) Patent No.: US 9,106,375 B2  
(45) Date of Patent: Aug. 11, 2015

(54) METHOD AND SYSTEM FOR ARRANGING RESOURCE ALLOCATION MESSAGES TO REDUCE BLIND DECODING COMPLEXITY IN OFDMA-BASED SYSTEMS

(75) Inventors: Sudhir Ramakrishna, Plano, TX (US); Kaushik Josiam, Dallas, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 710 days.

(21) Appl. No.: 12/776,156

(22) Filed: May 7, 2010

(65) Prior Publication Data

US 2010/0322132 A1    Dec. 23, 2010

Related U.S. Application Data

(60) Provisional application No. 61/269,045, filed on Jun. 19, 2009.

(51) Int. Cl.  
*H04L 1/00* (2006.01)  
*H04L 5/00* (2006.01)

(52) U.S. Cl.  
CPC ............... *H04L 1/0038* (2013.01); *H04L 1/00* (2013.01); *H04L 5/0023* (2013.01); *H04L 5/0037* (2013.01); *H04L 5/0092* (2013.01); *H04L 2001/0093* (2013.01)

(58) Field of Classification Search  
CPC ... H04L 1/0038; H04L 5/0037; H04L 5/0053; H04L 1/001; H04L 1/00; H04L 5/0023; H04L 5/0092; H04L 2001/0093  
USPC .............. 370/310, 310.2, 312, 328, 329, 330, 370/336, 337, 341, 343, 345, 431, 43, 2, 370/458, 464, 478–480, 485, 498; 455/561, 455/562.1, 103, 446  
See application file for complete search history.

(56) References Cited

U.S. PATENT DOCUMENTS 7,031,288 B2 * 4/2006 Ogier ........................... 370/338  
2002/0078194 A1 * 6/2002 Neti et al. ..................... 709/224

(Continued)

FOREIGN PATENT DOCUMENTS

CN         101399733 A     4/2009  
KR    1020090039968 A     4/2009

(Continued)

OTHER PUBLICATIONS

International Search Report dated Feb. 24, 2011 in connection with International Patent Application No. PCT/KR2010/003948.

(Continued)

*Primary Examiner* — Curtis A Alia

(57) ABSTRACT

A base station and subscriber station are capable of communicating with each other in a wireless communication network. The base station allocates resources to the subscriber station through resource allocation messages included in a resource allocation region of a downlink communication. The resource allocation region is partitioned into a plurality of sub-regions. Conventions regarding the arrangement of the resource allocation messages are disclosed which enable the subscriber station to decode the resource allocation messages contained in a sub-region and cease decoding operations upon reaching the end of the sub-region. Accordingly, the subscriber station does not decode resource allocation messages contained in subsequent sub-regions.

34 Claims, 8 Drawing Sheets

(56) References Cited

U.S. PATENT DOCUMENTS

| | | | |
|---|---|---|---|
| 2005/0286408 A1* | 12/2005 | Jin et al. | 370/208 |
| 2007/0058523 A1* | 3/2007 | Cho et al. | 370/208 |
| 2007/0173198 A1* | 7/2007 | Kim et al. | 455/63.1 |
| 2008/0025337 A1* | 1/2008 | Smith et al. | 370/439 |
| 2008/0304588 A1* | 12/2008 | Pi | 375/260 |
| 2009/0022098 A1* | 1/2009 | Novak et al. | 370/329 |
| 2009/0086670 A1 | 4/2009 | Hart et al. | |
| 2009/0092090 A1 | 4/2009 | Beems Hart et al. | |
| 2009/0129495 A1* | 5/2009 | Jin et al. | 375/260 |
| 2009/0197610 A1* | 8/2009 | Chun et al. | 455/450 |
| 2010/0120442 A1* | 5/2010 | Zhuang et al. | 455/450 |
| 2010/0279628 A1* | 11/2010 | Love et al. | 455/70 |

FOREIGN PATENT DOCUMENTS

| | | | |
|---|---|---|---|
| WO | WO 2008-067503 A1 | 6/2008 | |
| WO | WO 2009/041779 A1 | 4/2009 | |
| WO | WO 2009-041779 A1 | 4/2009 | |
| WO | WO 2009130280 A2 * | 10/2009 | |

OTHER PUBLICATIONS

Written Opinion of the International Searching Authority dated Feb. 24, 2011 in connection with International Patent Application No. PCT/KR2010/003948.

"Part 16: Air Interface for Fixed and Mobile Broadband Wireless Access Systems, Advanced Air Interface (working document)", IEEE WirelessMan 802.16, Mar. 2008, 350 pages.

Translated Japanese Office Action dated Feb. 25, 2014 in connection with Japanese Patent Application 2012-515990; 6 pages.

Translated Chinese Office Action dated Jul. 3, 2014 in connection with Chinese Patent Application No. 2010800270566; 23 pages.

Notice of Patent Grant dated Dec. 16, 2014 in connection with Japan Patent Application No. 2012-515990; 5 pages.

Translated Chinese Office Action dated Mar. 26, 2015 in connection with Chinese Patent Application No. 2010800270566; 16 pages.

* cited by examiner

METHOD AND SYSTEM FOR ARRANGING RESOURCE ALLOCATION MESSAGES TO REDUCE BLIND DECODING COMPLEXITY IN OFDMA-BASED SYSTEMS

CROSS-REFERENCE TO RELATED APPLICATION(S) AND CLAIM OF PRIORITY

The present application is related to U.S. Provisional Patent No. 61/269,045, filed Jun. 19, 2009, entitled "METHODS FOR REDUCTION OF COMPLEXITY OF THE BLIND DECODING OF RESOURCE ALLOCATION MESSAGES IN OFDMA-BASED SYSTEMS BY MESSAGE ARRANGEMENT CONVENTIONS". Provisional Patent No. 61/269,045 is assigned to the assignee of the present application and is hereby incorporated by reference into the present application as if fully set forth herein. The present application hereby claims priority under 35 U.S.C. §119(e) to U.S. Provisional Patent No. 61/269,045.

TECHNICAL FIELD OF THE INVENTION

The present application relates generally to wireless communications and, more specifically, to a system and method for blind decoding of resource allocation messages.

BACKGROUND OF THE INVENTION

In a cellular communications system, a certain geographical region is divided into regions referred to as cells. The mobile stations (MSs) in each cell are served by a single base station (BS). A BS transmits information to a particular MS (or a group of MSs) in its cell on the radio path referred to as the downlink (DL), while the MSs transmit information to the BS on the radio path referred to as the uplink (UL). The transmissions on the UL and the DL may be on the same time intervals but on different frequency bands, referred to as frequency division duplexing (FDD), or on the same frequency band but during non-overlapping time intervals, referred to as time division duplexing (TDD). In some systems, the transmissions on the DL and UL are based on Orthogonal Frequency Division Multiplexing (OFDM) modulation. In OFDM modulation, the available bandwidth for the radio link (DL or UL) is divided into a large number of smaller-bandwidth units referred to as sub-carriers (SCs), onto which the information to be transmitted is embedded.

Due to OFDM modulation, on the UL, if the MSs in a cell simultaneously use non-overlapping SC sets to make transmissions to the BS, then when received at the BS, the transmission from any MS is rendered orthogonal to the transmission from any other MS. For example, MS(i) uses SC set $\{Si\}$ to perform UL transmissions to the BS; and the SC sets used by different MSs are non-overlapping. Then, when received at the MS, the transmissions from MS(i) on SC set $\{Si\}$ are not interfered with by any of the transmissions to the BS from any of the MSs j, where $j \neq i$.

Similarly, on the DL, if the BS uses non-overlapping SCs to make simultaneous transmissions to different MSs, then at any MS, the transmissions meant for other MSs appear orthogonal to the transmissions meant for it. For example, the BS can transmit to MS(i) using SC set $\{Si\}$, and use non-overlapping SC sets to perform transmissions to various MSs. Then, when received at MS(i), the transmissions from the BS on SC set $\{Si\}$ are not interfered with by any of the transmissions from the BS to any of the MSs j, where $j \neq i$. This property of OFDM modulation allows simultaneous communications between several MSs and the BS on the UL, and the BS and several MSs on the DL.

SUMMARY OF THE INVENTION

A subscriber station capable of communicating with at least one base station in the wireless network is provided. The subscriber station includes a plurality of antennas; and a controller coupled to the plurality of antennas. The controller is configured to receive at least one resource allocation message included in a resource allocation region. The resource allocation region is partitioned into a plurality of sub-regions. A first sub-region includes the resource allocation message. The controller is configured to decode the resource allocation message and cease decoding upon reaching the end of the first sub-region.

A base station capable of communicating with at least one subscriber station in the wireless network is provided. The base station includes a plurality of antennas and a controller coupled to the plurality of antennas. The controller is configured to transmit at least one resource allocation message included in a resource allocation region. The resource allocation region is partitioned into a plurality of sub-regions. A first sub-region includes the resource allocation message such that the subscriber station can decode the first sub-region and cease decoding at the end of the first sub-region.

A method for communicating with at least one base station in the wireless network is provided. The method includes receiving, by a subscriber station, at least one resource allocation message included in a resource allocation region. The resource allocation region is partitioned into a plurality of sub-regions. A first sub-region includes the resource allocation message. The method also includes decoding the resource allocation message in the first sub-region. Further, the method includes terminating the decoding at the end of the first sub-region.

A method for communicating with at least one subscriber station in the wireless network is provided. The method includes transmitting, by a base station, at least one resource allocation message included in a resource allocation region. The resource allocation region is partitioned into a plurality of sub-regions. A first sub-region includes the resource allocation message. The resource allocation message is configured to enable the subscriber station to decode the first sub-region and cease decoding at the end of the first sub-region.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is noted that the LTE term "node B" is another term for "base station" used below. Further, the term "cell" is a logical concept that can represent a "base station" or a "sector" belonging to a "base station". In the present disclosure, "cell" and "base station" are used interchangeably to indicate the actual transmission units (may be "sector" or "base station" and the like) in the wireless system. Also, the LTE term "user equipment" or "UE" is another term for "subscriber station" or "mobile station" used below. It is noted that in all the following figures, some optional features are explicitly marked while some are omitted for clarity purpose.

Figure 1:
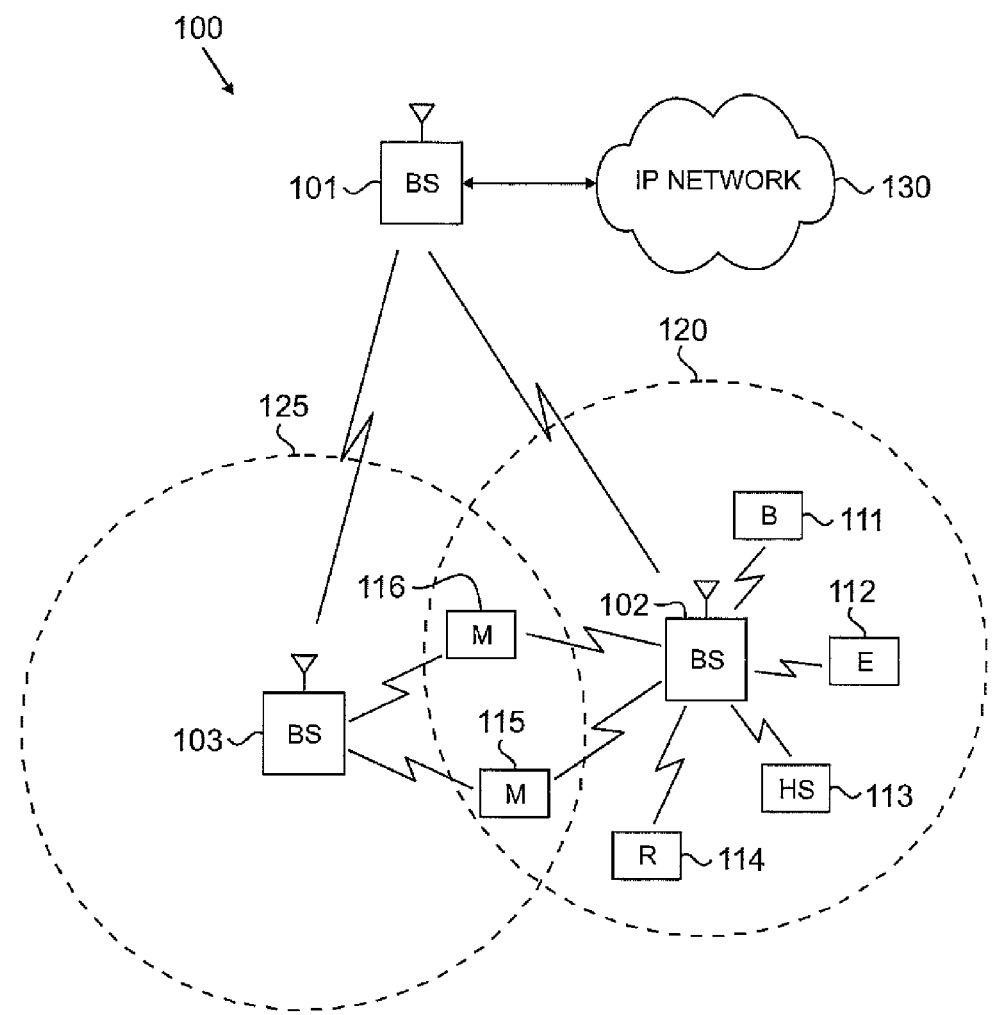
FIG. 1 illustrates exemplary wireless network 100 that is capable of decoding data streams according to embodiments of the disclosure.

FIG. 1 illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (B), SS 112 may be located in an enterprise (5), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet or other controller unit by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

In accordance with an embodiment of the present disclosure, one or more of base stations 101-103 and/or one or more of subscriber stations 111-116 include a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 2:
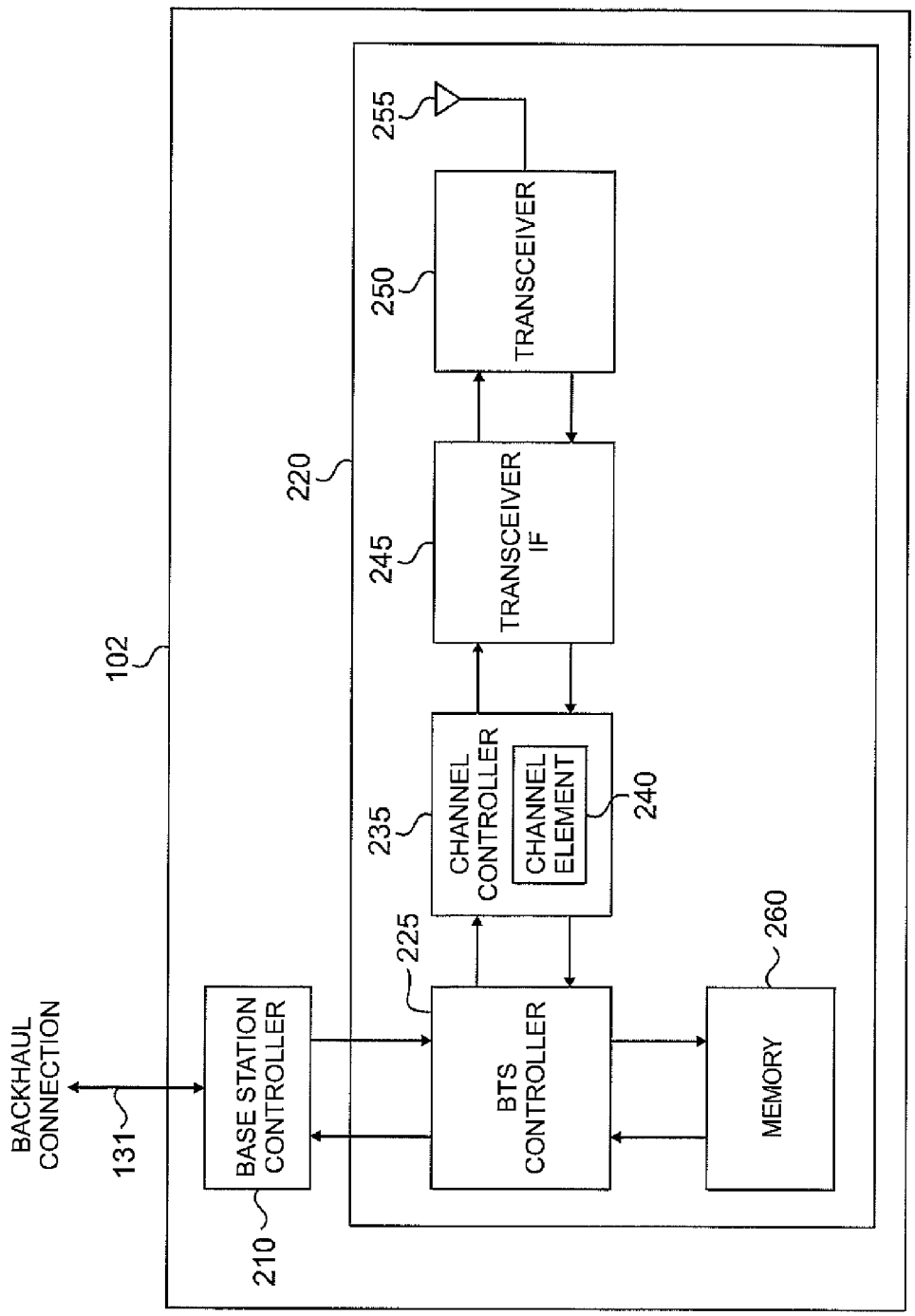
FIG. 2 illustrates exemplary base station in greater detail according to embodiments of the present disclosure.

FIG. 2 illustrates an exemplary base station in greater detail according to one embodiment of the present disclosure. The embodiment of base station 102 illustrated in FIG. 2 is for illustration only. Other embodiments of the base station 102 could be used without departing from the scope of this disclosure.

Base station 102 comprises base station controller (BSC) 210 and base transceiver subsystem (BTS) 220. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a memory 260. The embodiment memory 260 included within BTS 220 is for illustration only. Memory 260 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an advantageous embodiment of the present disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of the present disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of the present disclosure, BTS controller 225 is operable to execute programs, such as an operating system (OS) and processes for resource allocations, stored in a memory 260. Memory 260 can be any computer readable medium, for example, the memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 260 comprises a random access memory (RAM) and another part of memory 260 comprises a Flash memory, which acts as a read-only memory (ROM).

BSC 210 is operable to maintain communications between BS 102 and BS 101 and BS 103. BS 102 communicates to BS 101 and BS 103 via the wireless connection 131. In some embodiments, the wireless connection 131 is wire-line connection.

Figure 3:
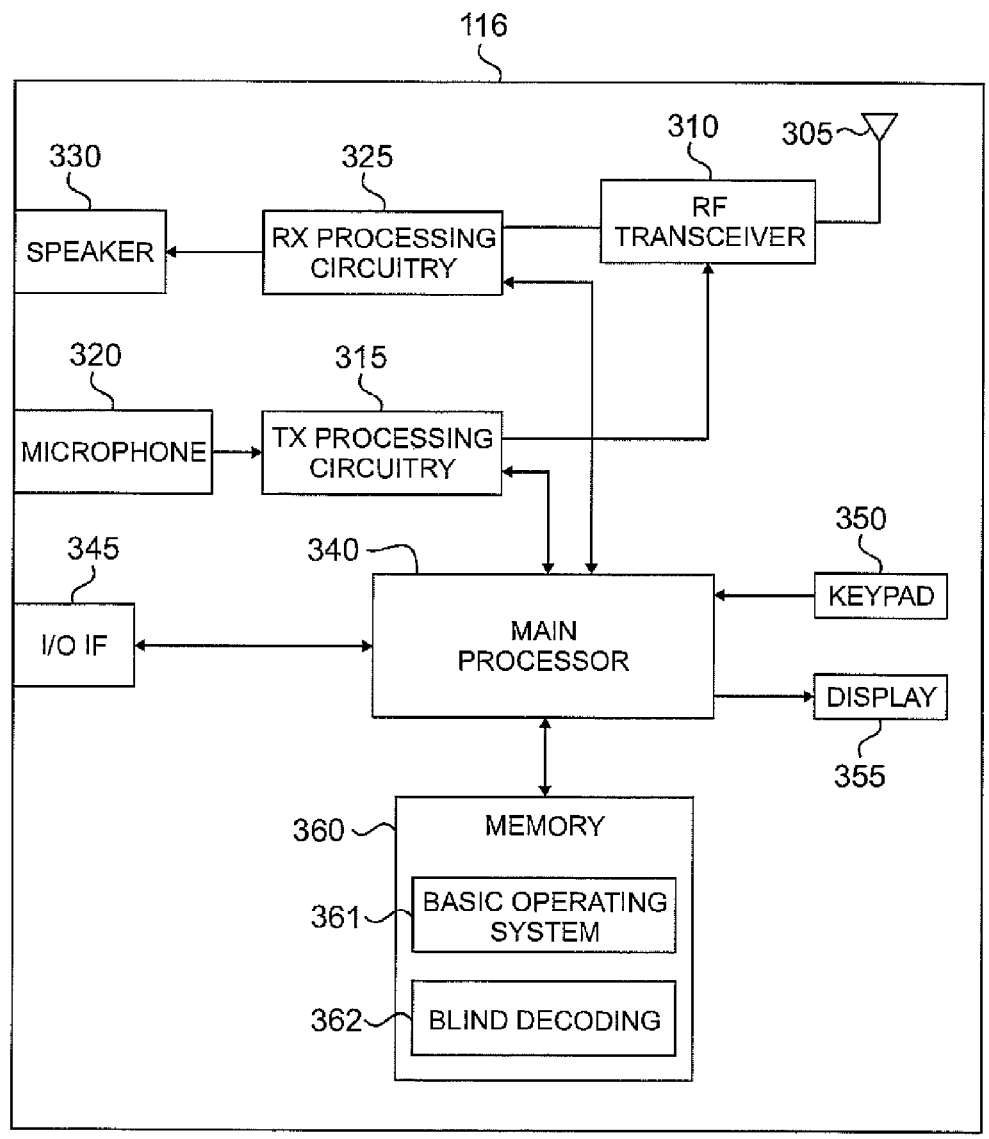
FIG. 3 illustrates an exemplary wireless mobile station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and applications and/or instructions for decoding and interpreting resource allocations 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. In some embodiments, the main processor 340 is configured execute programs, such as processes for decoding and interpreting resource allocations 362. The main processor 340 can execute processes for decoding and interpreting resource allocations 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

In the OFDM-based system, the basic time unit over which the transmissions (from BS 102 to SS 111-116, and from SS 111-116 to BS 102) occur is called an OFDM symbol. On the UL, the transmissions by SS 111-116 are coordinated to ensure that non-overlapping SC sets are being used, and each SS has been instructed, by BS 102, as to which SC set to use for transmissions to BS 102. Similarly, on the DL, BS 102 uses non-overlapping SC sets to make transmissions to SS 111-116, and the SSs are instructed, by BS 102, as to which SC sets to listen to receive the transmissions meant for them.

The instructions to the SSs, whether regarding which SC set to use for UL transmissions, or which SC set on which to receive DL transmissions, are referred to as Resource Allocation Messages. The resource allocation messages are transmitted by BS 102 on an SC set referred to as the Resource Allocation Region. For example, several resource allocation messages, each meant for a particular SS or a group of SSs, are carried on SCs that are part of the Resource Allocation Region.

Each of SS 111-116 is aware of the resource allocation region; and each of SS 111-116 receives, decodes and interprets the resource allocation messages in the resource allocation region to learn about the SC set the SS is to use for UL transmissions and/or the SC set on which the SS is to receive DL transmissions.

The SC sets that are available for transmissions by BS 102 to SS 111-116 on the DL, and by SS 111-116 to BS 102 on the UL, are classified into two broad categories: distributed resources and contiguous resources. It is first noted that a logical index of a resource is the index with which it is referred to in allocations, and which, along with a convention for translation to physical resources, allows a BS or an SS to determine which physical resource to which the allocation refers.

The IEEE 802.16e system described in IEEE Std. 802.16e-2005, IEEE Standard for Local and metropolitan area networks,—Part 16: Air Interface for fixed and mobile broadband wireless access systems,—Amendment 2: Physical and Medium Access Control Layers for Combined Fixed and Mobile Operation in Licensed Bands, and IEEE Std. 802.16-2004/Cor1-2005, Corrigendum 1, December 2005, the contents of which hereby are incorporated by reference in their entirety, is an example of an OFDM based system employing the above descriptions. In the IEEE 802.16e system, the resource allocation messages are referred to as MAP messages and the resource allocation region is referred to as the MAP-Region.

With respect to the design & structure of the resource allocation messages in the resource allocation region, and the procedure for the SSs, such as SS 116, to decode and interpret the resource allocation messages, two broad philosophies, which are commonly followed, are enumerated herein.

In a "Joint Encoding" philosophy, all the resource allocation messages that are possibly meant for several subscriber stations are jointly encoded, modulated and transmitted on the resource allocation region; pre-determined coding and modulation schemes, known to all subscriber stations, are utilized. Each individual resource allocation message contains information regarding the subscriber station (or group of subscriber stations) for which the resource allocation is meant to allocate resources. Each SS decodes this jointly encoded resource allocation to determine resource allocations for the respective subscriber stations. For example, SS 116 decodes this jointly encoded set of resource allocation messages, and, having access to all the resource allocation messages, identifies the ones that are meant for SS 116, and consequently identifies the resources on which SS 116 is meant to transmit and/or receive. Additionally, SS 115 decodes this jointly encoded set of resource allocation messages, and, having access to all the resource allocation messages, identifies the ones that are meant for SS 115, and consequently identifies the resources on which SS 115 is meant to transmit and/or receive. This philosophy leads to simple decoding at the subscriber station, but is wasteful of resources, since it has to be ensured that the jointly encoded resource allocation message set reaches (i.e., is decodable by) all subscriber stations in the cell. For example, the IEEE 802.16e system utilizes this philosophy.

In the "SS-specific encoding, blind decoding" philosophy, each of the individual resource allocation messages are encoded, scrambled and modulated separately, and then embedded onto the SCs in the resource allocation region. A resource allocation message is scrambled in such a way that only the target SS for the resource allocation message (i.e., the one for which the message is specifying the resource allocations) is able to decode the resource allocation message, realize that the resource allocation has been decoded correctly, and then interpret the resource allocation.

For example, consider a resource allocation message meant for SS 116. Then, only SS 116 can decode the resource allocation message (with some probability of error) and realize that it has decoded the resource allocation message correctly; after which SS 116 can proceed to interpret the decoded bits in the resource allocation message. Any other subscriber station, such as SS 115, when attempting to decode the resource allocation message, will be unable to do so, and will realize that it has been unable to decode the resource allocation message; as a result SS 115 will realize that that message is not meant for SS 115. In this case, there will be a probability, designed to be small, that SS 115, does erroneously conclude that the message (which was not meant for SS 115) was meant for SS 115. A well known method to enable the discovery of whether or not a resource allocation message was meant for a subscriber station, and whether a decode attempt on that resource allocation message was successful, is the use of a Cyclic Redundancy Check (CRC) scrambled by a subscriber station-specific bit sequence, as follows. In this method, the first step is to calculate the value of a known linear combination of the information bits in the resource allocation message. This linear combination is referred to as the CRC. Next, the CRC value is XORed with an identification bit sequence which is unique to the intended subscriber station, where XOR refers to the binary exclusive-OR operation. This yields the scrambled CRC bit sequence. This scrambled CRC is then appended to the end of the information bits to form the complete payload in the resource allocation message. A subscriber station, after the decode attempt, then calculates the same linear combination on the resource allocation message information bits it thinks it decoded, and then XORes the calculated CRC with the scrambled CRC that was appended to the end of the information bits by the base station. Due to the property of the XOR operation, if the resource allocation message has been decoded correctly, that is, if the linear combination on the information bits calculated by the SS is correct, then this XOR operation simply yields the identification bit sequence used by the base station in constructing the scrambled CRC. If this identification sequence matches the SS's identification sequence, then it knows that the resource allocation message has been decoded correctly and is meant for it. The term "CRC Check" or "Cyclic Redundancy Check" will be used in the following descriptions and the claims to refer to the above method used by a SS to detect whether a resource allocation message was meant for it as well as to detect whether it was decoded successfully. The term "CRC success" will then imply that a SS successfully detected that a resource allocation message was meant for it, and successfully decoded it as well.

The set of resource allocation message information sizes and structure (modulation & coding used) is defined and known to all subscriber stations. Each SS then attempts to decode the individual resource allocation messages in the resource allocation region, iteratively trying out each of the resource allocation message structure (size, modulation, coding) hypotheses. This procedure is often referred to as blind decoding, with the "blind" referring to the fact that an SS attempts the decoding with no knowledge of (or a very limited knowledge of) the number and specific structures (size, modulation, coding) of the individual resource allocation messages in the resource allocation region. Using this philosophy, a resource allocation message can be transmitted with the optimal modulation and coding for reception by a particular SS, taking into account the radio link quality between the BS and that SS. Hence, this philosophy makes a more efficient use of the resource allocation region than the "Joint Encoding" philosophy. However, due to the requirement of the blind decoding operation, it imposes higher complexity on the SS. The LTE System 3GPP TS 36.300, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", V8.7.0, December 2008, the contents of which hereby are incorporated by reference, as well as the proposed IEEE 802.16m system 802.16m-09/0010r2, Section 15.3.6.2.2.2, "Part 16—Air Interface fir Fixed and Mobile Broadband Wireless Access Systems; Advanced Air Interface (working document)", Jun. 6, 2009 (which can be obtained from http://wirelessman.org/tgm/ by following the link to the "IEEE 802.16m Amendment Working Document"), the contents of which hereby are incorporated by reference, are examples of systems that utilize this philosophy.

Figure 4:
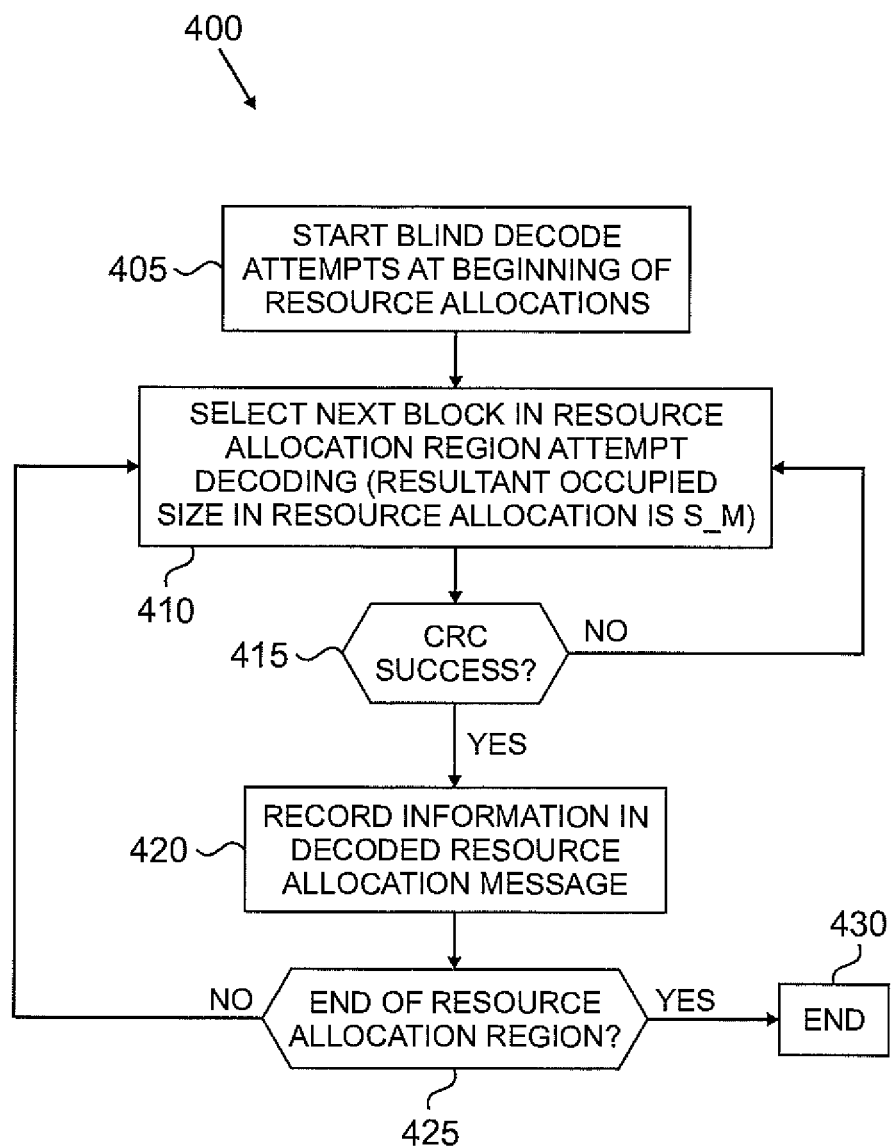
FIGS. 4 through 8 illustrate processes for blind decoding by a subscriber station according to embodiments of the present disclosure.

FIG. 4 illustrates a possible process for blind decoding by a subscriber station. The blind decoding process 400 at SS 116 in the special case in which each of the resource allocation messages have the same size (i.e., the same number of information+CRC bits) and have been processed by the same Modulation and Coding Schemed (MCS), and consequently occupy the same size in the resource allocation region.

In block 405, SS 116 starts blind decode attempts at the beginning of the resource allocation region. Knowing the resource allocation message (e.g., information +CRC) size is "S" and MCS is "M", SS 116 knows that the resultant occupied size in the resource allocation region is S_M. Therefore, in block 410, SS 116 selects the first S_M block in the resource allocation region and attempts decoding using the size, modulation and coding. In block 415, SS 116 determines if the decoding was successful by checking the CRC. If the CRC check is not successful, SS 116 returns to block 410. If the CRC check is successful, SS 116 records the information in the decoded resource allocation message in block 420. Thereafter, SS 116 determines if the end of the resource allocation region has been reached in block 425. If the end of the resource allocation has not been reached, SS 116 returns to block 410 and selects the next block in the resource allocation and attempts another decoding operation. If the end of the resource allocation has been reached, the process ends in block 430.

Figure 5:
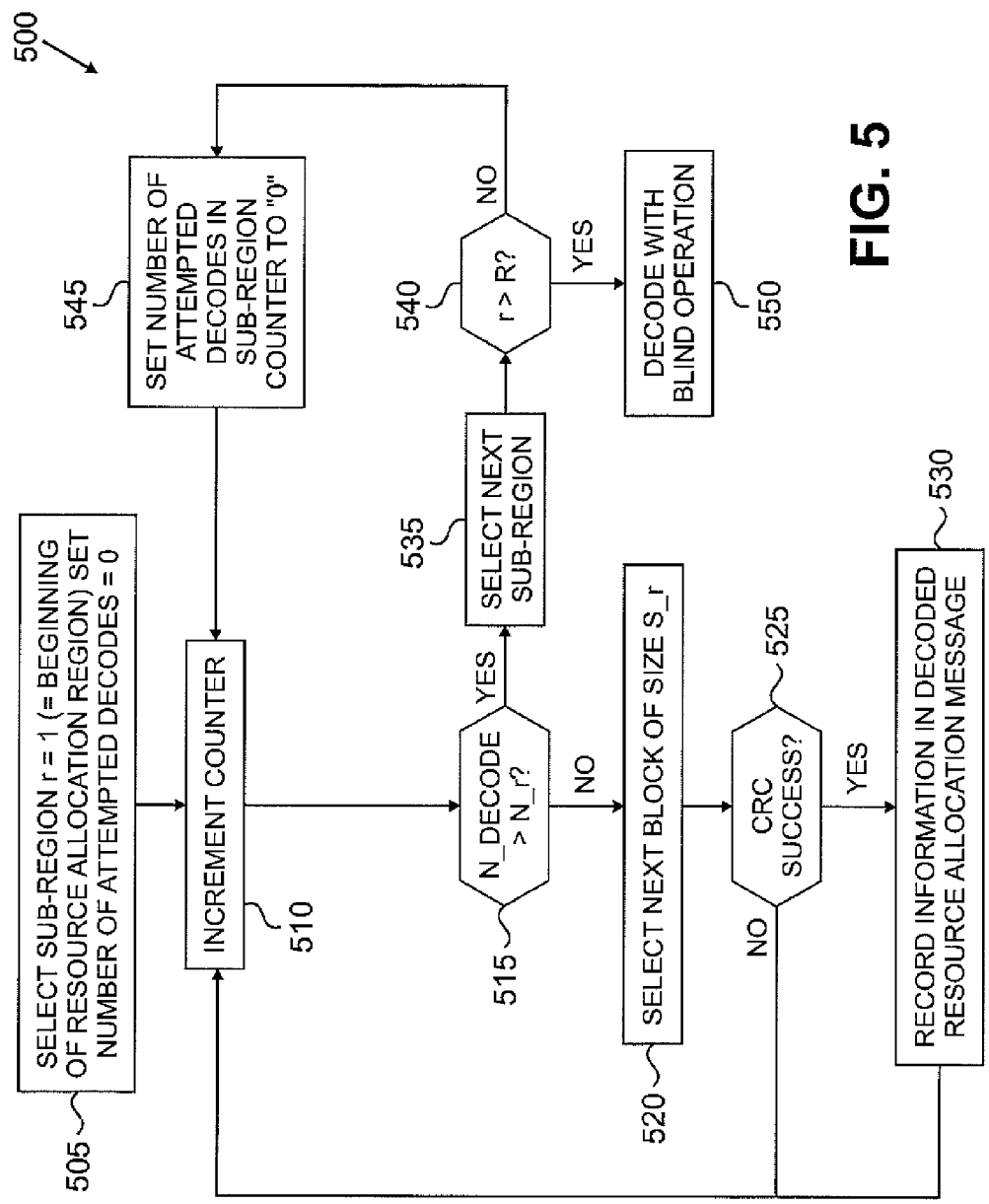

FIG. 5 illustrates a process for blind decoding by a subscriber station with a division of the resource allocation region into sub-regions. The blind decoding process 500 shown in FIG. 5 is for illustration only.

BS 102 partitions the resource allocation region according to the size of the resource allocation message and the MCS used to encode the underlying information in the resource allocation message. Hence, one set of resource allocation messages are arranged contiguously in one portion of the resource allocation region. Each set of resource allocation messages is of a certain size, i.e., containing a certain known number of information & CRC bits, and is processed by a certain and same MCS. Each set of resource allocation messages is followed by a contiguous arrangement of another set of resource allocation messages with each resource allocation message in that set being of a known and possibly different size and processed by a possibly different MCS, and so forth. Information regarding the composition of resource allocation messages in each region (i.e., the information+CRC size of each message, & the MCS used to process it), the location of the beginning of each region, and the number of resource allocation message in each region, is made known to SS 111-SS 116. It may be noted that a resource allocation message with a known (information +CRC) size and a known MCS define a known size in the resource allocation region. Then, when performing the blind decoding operation in any region, SS 116 knows that all the resource allocation messages in that region are of a certain size and have been processed by a certain MCS, and therefore does not need to test for multiple resource allocation size or MCS hypothesis. This leads to a reduction in blind decoding complexity. The region within the resource allocation region, consisting of resource allocation messages having the same size and processed by the same MCS, is referred herein as a resource allocation sub-region.

SS 116 is configured to know: the number of resource allocation sub-regions "R"; for each sub-region "r", $1 \leq r \leq R$; the size in the sub-region occupied by each resource allocation message is $S\_r$; the MCS used to process each message in the sub-region is $M\_r$; and the Number of messages in the sub_region is $N\_r$.

In block 505, SS 116 selects a sub-region, such as r=1 which is the beginning of the resource allocation region. SS 116 also sets a number of attempted decodes in the sub-region counter equal to zero (e.g., N_decode=0). In block 510, SS 116 increments the number of attempted decodes in the sub-region counter by "1" such that N_decode=N_decode+1. SS 116 determines whether N_decode is greater than the number of message in the sub-region (i.e., N_decode>N_r?) in block 515.

If N_decode≤N_r, then, in block 520, SS 116 selects the next block of size S_r and attempts a decoding operation using MCS M_r. SS 116 determines if the decoding operation was successful by performing a CRC check in block 525. If the CRC check is not successful, SS 116 returns to block 510 and increments the number of attempted decodes in the sub-region counter by "1" such that N_decode=N_decode+1. If the CRC check is successful, SS 116 records the information in the decoded resource allocation message in block 530. Thereafter, SS 116 returns to block 510 and increments the number of attempted decodes in the sub-region counter by "1" such that N_decode=N_decode+1.

If N_decode>N_r, then, in block 535, SS 116 selects the next sub-region such that r=r+1. Then SS 116 determines if the end of the resource allocation has been reached in block 540. SS 116 determines that the end of the resource allocation region has been reached if r>R. If end of the resource allocation region has not been reached, that is r≤R, then SS 116 resets number of attempted decodes in the sub-region counter in block 545. That is, SS 116 sets N_decode=0. If end of the resource allocation region has been reached, that is r>R, then SS 116 ends the blind decode operation in block 550.

In some embodiments, BS 102 transmits several individual resource allocation messages to SS 116 in the resource allocation region. Two examples of situations where this may happen are as follows.

In a first example, BS 102 makes a resource allocation on the UL, telling SS 116 which set of SCs to transmit on the UL, as well as a resource allocation on the DL, telling SS 116 which SCs to listen to on the DL for transmissions from the BS 102. Then, these two allocations may be carried in two separate resource allocation messages. This is an example where two different resource allocations are conveyed in two separate individual resource allocation messages.

In a second example, BS 102 makes a resource allocation on the DL, telling SS 116 which SCs to receive BS 102 transmissions on. This resource allocation is carried on several individual resource allocation messages. SS 116 decodes each of the resource allocation messages, and then interprets the contents of the messages together to learn the resource allocation.

Several reasons can exist as to why BS 102 uses several separate resource allocation messages (meant to be interpreted together) to convey a single resource allocation, as opposed to using a single resource allocation message to convey a single resource allocation. One possible situation is the case where, to reduce the number of hypotheses for blind decoding, only a small and limited set of resource allocation message sizes exist. In this case, large resource allocation messages (i.e., messages with a large number of information bits) may not fit into a single resource allocation message, necessitating the use of multiple resource allocation messages to convey the resource allocation. This is an example where the same resource allocation is conveyed in multiple individual resource allocation messages.

The resource allocation messages can be broadly classified into two types based on whether they are directed toward exactly one SS or toward a group of SSs, as follows. The two types are a Unicast resource allocation message and a multicast resource allocation message.

Unicast resource allocation messages are resource allocation messages transmitted by BS 102 that convey resource allocation information to a single SS, such as SS 116, controlled by BS 102. In the context of blind decoding, SS 116, which is the targeted SS, can decode the message (with some error probability), detect that it has decoded it successfully, and interpret the message. Any other SS, such as SS 111-SS 115, will fail to decode the message, and will conclude that the message is not meant for the SS (again with some probability of false success).

Unicast resource allocations and the corresponding messages that covey them can further be classified into several types, based on the type of resource allocation they convey, such as:

1) one-time DL/UL assignments, which indicate a particular time duration for which the DL/UL assignment is valid;

2) persistent DL/UL assignments, which indicate yet another (usually longer) duration for which the DL/UL assignment is valid;

3) UL assignment meant to carry acknowledgements (successfully/unsuccessfully received messages) from the MS to information transmitted by the BS to that MS on the DL; and so forth.

It should be noted further classification is also possible.

Multicast resource allocation messages are resource allocation messages transmitted by BS 102 that convey resource allocation information to more than one SS, such as SS 111-SS 116, controlled by BS 102. Here, the group of SSs targeted by the multicast resource allocation message may be the set of all SSs in the cell (in which case the multicast resource allocation message is usually referred to as a broadcast resource allocation message), or the group of SSs could be any subset of the set of all SSs controlled by BS 102 (in which case the multicast resource allocation message is sometimes referred to as a group resource allocation message). In the context of blind decoding, each SS in the target set can decode the message (with some error probability), detect that the SS has decoded the message successfully, and interpret the message (or portion of message that applies to it, based on some convention). Any other SS that is not part of the target group will fail to decode the message, and will conclude that the message is not meant for the SS (again with some probability of false success). The multicast messages may also be classified into several more types.

Embodiments of the present disclosure classify messages as unicast or multicast by function, that is, by whether they convey resource allocation information to a single or many subscriber stations. Further, in any particular embodiment, the definition of a unicast or a multicast message may be implicit. As an example, in 802.16m-09/0010r2, Section 15.3.6.2.2.2, "Part 16—Air Interface for Fixed and Mobile Broadband Wireless Access Systems; Advanced Air Interface (working document)", resource allocation messages are classified into types, and the type of a message is carried as a field inside the message. In particular, there is a definition of a message type "DL Basic Assignment Message", which is meant to convey a downlink resource allocation to a single mobile. This is a unicast message (by function) for the purposes of embodiments of the present disclosure, even though the message is identified by a different identifier type in 802.16m-09/0010r2, Section 15.3.6.2.2.2, "Part 16—Air Interface fir Fixed and Mobile Broadband Wireless Access Systems; Advanced Air Interface (working document)."

A disadvantage of the blind decoding techniques, as detailed above, can be that in order to learn about its resource allocations, SS 116 has to attempt to decode the resource allocation region in its entirety. Embodiments of the present disclosure seek to alleviate this disadvantage. In some embodiments arrangement rules are utilized to define how the different resource allocations for an SS, carried by the respective resource allocation messages, are arranged in the resource allocation region, with a view to enable the early termination (i.e., termination before reaching the end of the resource allocation region) of the blind decoding operation in some cases.

In the following embodiments, a message arrangement order is utilized, which is the order in which the various resource allocations (i.e., the resource allocation messages that convey them) are arranged in the resource allocation region. In the embodiments illustrated in FIG. 6, BS 102 knows and SS 116 is informed, or knows of, a "beginning of the resource allocation region", "end of the resource allocation region", and a "direction of resource blocks within the resource allocation region, leading from the beginning of the region to the end of the region, which is also the order of the SCs within the resource allocation region on which an SS would attempt successive blind decode operations". Also, the resource allocation region is partitioned into sub-regions, each of which consist of resource allocation messages having the same size and processed by the same MCS, and that the details of the sub-regions (composition in terms of size, MCS and number of messages within) are known to all SSs, as discussed herein above with respect to FIG. 5.

In some embodiments, all the unicast resource allocation messages for a particular subscriber station exist only in one of the sub-regions of the resource allocation region. Further, the convention is not explicitly communicated to the BS 102 to any SS, such as SS 111-116, regarding the presence or absence of a unicast resource allocation message meant for that SS in any sub-region.

Here, a sub-region is, as defined before, a portion of the resource allocation region containing resource allocation messages, all of which are of the same size and have been processed by the same MCS. The unicast message is a message that contains resource allocation information meant for only one subscriber station, and is meant to be decoded only by that subscriber station.

Once SS 116 successfully decodes the unicast message in a particular sub-region, SS 116 knows that no unicast messages exist for SS 116 in any other sub-region. Therefore, when attempting to decode the unicast messages meant for SS 116, SS 116 need not attempt to blindly decode any subsequent (following) sub-regions in the resource allocation region.

It is be noted that all resource allocation messages in a sub-region, by virtue of being processed by the same MCS, enjoy the same level of protection to radio channel impairments. Since all the unicast messages meant for a subscriber station undergo the same radio channel, all of the messages are afforded the same level of protection.

Figure 6:
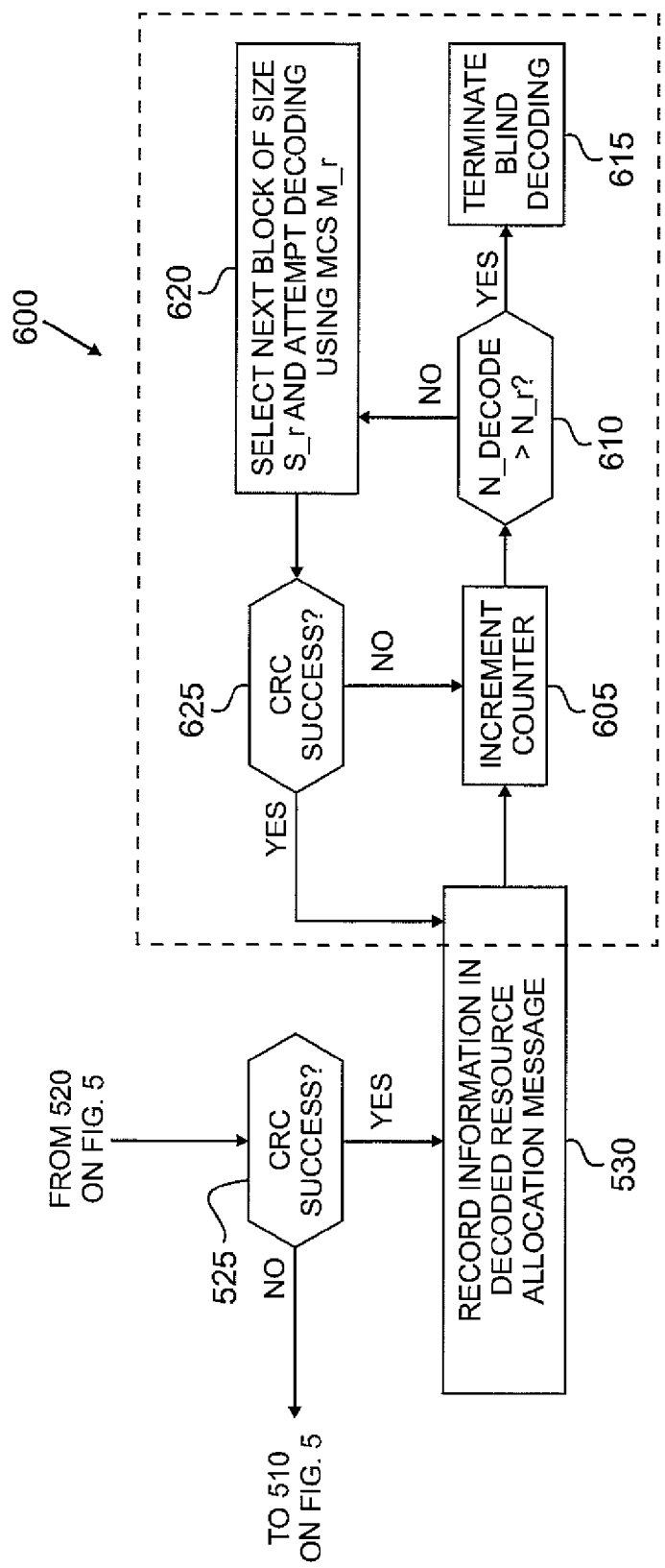

FIG. 6 depicts the blind decoding process 600 in one example where all resource allocation messages in the resource allocation region are of the unicast variety, i.e., no multicast assignments exist.

SS 116 follows the blind decoding process 500 as illustrated in FIG. 5. However, after recording the information decoded in the resource allocation message in block 530, rather than returning to block 510, SS 116 increments the counter in block 605. SS 116 increments the number of attempted decodes in the sub-region counter by "1" such that N_decode=N_decode+1. SS 116 then determines whether N_decode is greater than the number of messages in the sub-region (i.e., N_decode>N_r?) in block 610. If N_decode>N_r, then, in block 615, SS 116 ends the blind decode operation. Accordingly, after CRC success in block 525, SS 116 decodes until the end of the sub-region (that is, SS 116 does not decode the following sub-regions). If N_decode≤N_r, then, in block 620, SS 116 selects the next block of size S_r and attempts a decoding operation using MCS M_r. SS 116 determines if the decoding operation was successful by performing a CRC check in block 625. If the CRC check is not successful, SS 116 returns to block 605 and increments the number of attempted decodes in the sub-region counter by "1" such that N_decode=N_decode+1. If the CRC check is successful, SS 116 records the information in the decoded resource allocation message in block 530. Thereafter, SS 116 returns to block 605 and increments the number of attempted decodes in the sub-region counter by "1" such that N_decode=N_decode+1. SS 116 continues the process until N_decode is greater than the number of message in the sub-region (i.e., N_decode>N_r) in block 610; then, in block 615, SS 116 ends the blind decode operation. Accordingly, after CRC success in block 525, SS 116 decodes until the end of the sub-region (that is, SS 116 does not decode the following sub-regions).

Figure 7:
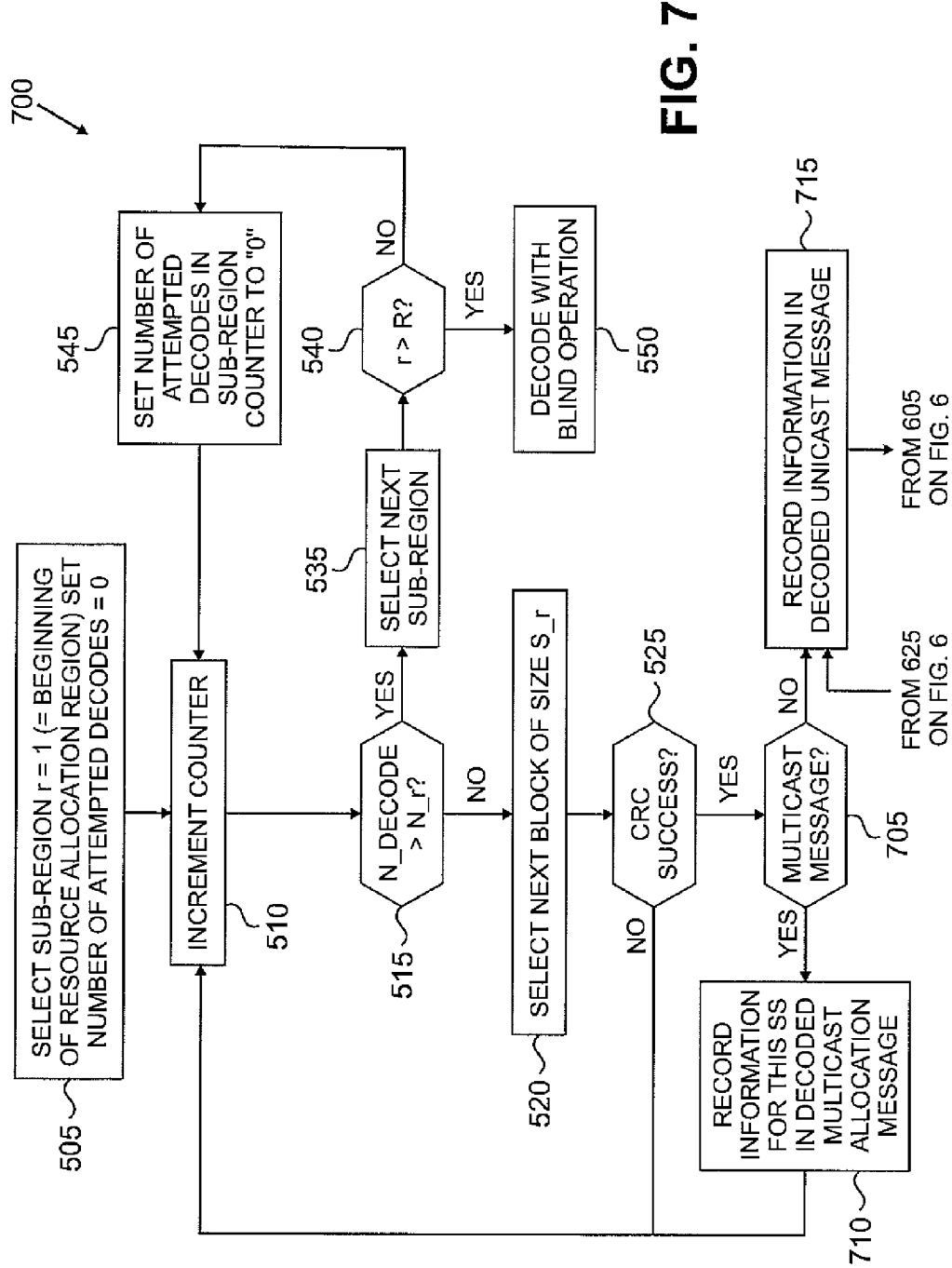

FIG. 7 illustrates the process for blind decoding by a subscriber station in the situation in which the resource allocation region may contain both multicast and unicast messages according to embodiments of the present disclosure. The blind decoding process 700 shown in FIG. 7 is for illustration only. Other embodiments could be used without departing from the scope of this disclosure.

In some embodiments, all the multicast resource allocation messages, if they exist, occupy a contiguous portion of the overall resource allocation region, starting from the beginning of the overall resource allocation region, and possibly spanning several sub-regions. Accordingly, if one traverses the resource allocation region from the beginning to the end in increasing resource block index, all the multicast messages, if they exist, occur prior to the occurrence of the first unicast message.

Similar to the blind decoding process 600 shown in FIG. 6, the convention for the blind decoding process 700 shown in FIG. 7 is not explicitly communicated to the subscriber stations.

Both the unicast and multicast messages may occur in the resource allocation region. If both unicast and multicast messages occur in the resource allocation region, then once SS 116 decodes a unicast resource allocation message in any sub-region, SS 116 knows that any multicast messages meant for SS 116 have already been encountered, and also that all unicast messages meant for SS 116 occur in the same sub-region. Therefore, SS 116 may terminate blind decoding after reaching the end of the current sub-region, since the following sub-regions will not contain any messages meant for SS 116.

In block 505, SS 116 selects a sub-region, such as r=1 which is the beginning of the resource allocation region. SS 116 also sets a number of attempted decodes in the sub-region counter equal to zero (e.g., N_decode=0). In block 510, SS 116 increments the number of attempted decodes in the sub-region counter by "1" such that N_decode=N_decode+1. SS 116 determines whether N_decode is greater than the number of message in the sub-region (i.e., N_decode>N_r?) in block 515.

If N_decode≤N_r, then, in block 520, SS 116 selects the next block of size S_r and attempts a decoding operation using MCS M_r. SS 116 determines if the decoding operation was successful by performing a CRC check in block 525. If the CRC check is not successful, SS 116 returns to block 510 and increments the number of attempted decodes in the sub-region counter by "1" such that N_decode=N_decode+1. If the CRC check is successful, SS 116 determines if the message is a multicast message in block 705.

If the message is a multicast message, SS 116 records the information intended for SS 116 in the decoded multicast resource allocation message in block 710. Thereafter, SS 116 returns to block 510 and increments the number of attempted decodes in the sub-region counter by "1" such that N_decode=N_decode+1.

If the message is not a multicast message, SS 116 records the information in the decoded unicast resource allocation message in block 715. Thereafter, SS 116 proceeds to block 605 on FIG. 6 to perform the blind decoding process 600.

In some embodiments of the blind decoding process 700, all the multicast resource allocation messages occupy contiguous portions of any sub-region starting from the beginning of that particular sub-region. In other words, any resource allocation sub-region that contains both multicast and unicast messages may be thought of as being partitioned into two further non-overlapping portions. The first portion, starting at the beginning of the sub-region, contains only multicast messages, while the second portion, which follows the first portion contiguously in the sub-region, contains only unicast messages. Unicast messages are not present in the first portion, and multicast messages are not present in the second portion. It may be noted that this embodiment applies only to those sub-regions that carry both multicast and unicast messages, and defines the order in which they appear in that sub-region. In such a sub-region, the first portion herein is referred to as the "multicast sub-region" and the second portion herein is referred to as the "unicast sub-region".

In the embodiments disclosed herein, it is possible to arrange the sub-regions in decreasing order of the robustness of the MCS used in the sub-region, i.e., in decreasing order of the degree of protection from radio channel impairments afforded by the MCS used in the sub-region. In other words, it is possible to arrange the sub-regions so that the sub-region with the most robust MCS will appear first, followed by the next robust MCS, and so forth, with the last sub-region having the least robust MCS.

Additionally, a more robust MCS is not used to transmit a unicast message to SS 116 as compared to a multicast message transmitted to SS 116. In other words, if SS 116 can tolerate the protection afforded by a certain MCS for a multicast message, BS 102 can transmit the unicast message to SS 116 using the same MCS, thus affording the same level of protection. Therefore, a unicast resource allocation message meant for SS 116 does not use a more robust MCS than a multicast message to SS 116. Further, the sub-region arrangement is used, all multicast messages for SS 116 appear prior to the first unicast message for SS 116.

Figure 8:
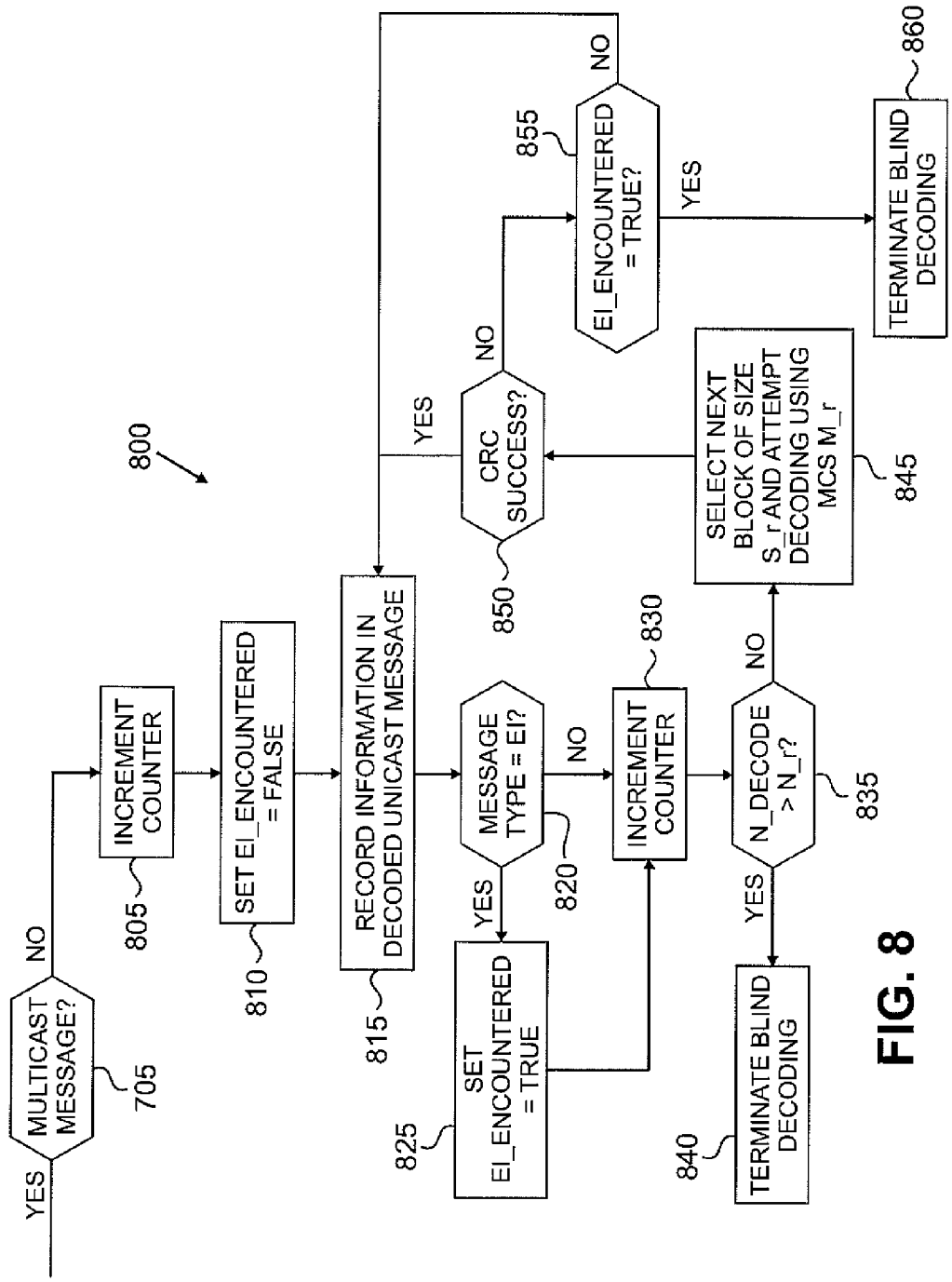

FIG. 8 illustrates process for a combination blind decoding by a subscriber station wherein both multicast & unicast resource allocation messages are present in the resource allocation region according to embodiments of the present disclosure. The combination blind decoding process 800 shown in FIG. 8 is for illustration only. Other embodiments could be used without departing from the scope of this disclosure.

In some embodiments, an End Indicator (EI) is utilized. With respect to the unicast messages meant for a particular subscriber station, such as SS 116, in a sub-region: all unicast messages intended for SS 116 are arranged contiguously in a sub-region; and a particular type of unicast resource allocation to SS 116, if it exists within a sub-region, always occurs last in the sequence of unicast messages meant for SS 116 in that sub-region. This particular unicast resource allocation message type herein is referred to as the EI.

If BS 102 is sending several unicast resource allocation messages to SS 116, which include one or more messages of the EI type, then all the messages occupy contiguous blocks in a sub-region, with the message of the EI type (or one of the messages of EI type in case there are more than one) being the last.

The specific value of the type EI can be agreed to based upon a convention between BS 102 and SS 116, and may not be explicitly conveyed to SS 116. The "type" of a message can be any identifier that allows differentiation among the various unicast resource allocation messages. This includes when the message type is part of the information content of the message. For example, the message type may be the first X bits of the information bits in the message. Then, upon successfully decoding the message (e.g., CRC success), SS 116 can check those first X bits to determine the type of the message SS 116 decoded, following which SS 116 can go on to interpreting the rest of the information bits in the message, maybe depending upon the message type.

Once SS 116 successfully decodes a unicast message of the EI type and determines that the next unicast message in that sub-region is not meant for SS 116, then SS 116 knows that no further unicast messages exist for SS 116 in that sub-region. Further, if blind decoding process 600 and the blind decoding process 700 are in operation, SS 116 also knows that SS 116 has no unicast messages in any of the following sub-regions, and that all multicast messages have already been encountered, respectively. Therefore, SS 116 can terminate the blind decoding operation without even reaching the end of that sub-region.

FIG. 8 illustrates the operation of the combination blind decoding process 800 wherein both multicast & unicast resource allocation messages are present in the resource allocation region.

SS 116 follows the blind decoding process 700 as illustrated in FIG. 7. However, if SS 116 determines that the message is not a multicast message in block 705, rather than recording the information in the decoded unicast resource allocation message in block 715, SS 116 increments the counter in block 805. SS 116 increments the number of attempted decodes in the sub-region counter by "1" such that N_decode=N_decode+1. Then, SS 116 sets an EI_Encountered value to "False" in block 810. In block 815, SS 116 records the information in the decoded unicast resource allocation message. Then, in block 820, SS 116 determines if the message is an EI type message. If the message is an EI type, SS 116 sets the EI_Encountered value to True in block 825 and increments the counter in block 830. Alternatively, if the message is not an EI type, SS 116 proceeds to block 830 to increment the counter. SS 116 increments the number of attempted decodes in the sub-region counter by "1" such that N_decode=N_decode+1.

SS 116 then determines whether N_decode is greater than the number of message in the sub-region (i.e., N_decode>N_r?) in block 835. If N_decode>N_r, then, in block 835, SS 116 terminates the blind decoding in block 840. No unicast message in any following region is interpreted. Further, all multicast messages also are already encountered. Further, all the messages of type EI have already been encountered. Hence, SS116 can exit the blind decoding process 700.

If N_decode≤N_r, then, in block 845, SS 116 selects the next block of size S_r and attempts a decoding operation using MCS M_r. SS 116 determines if the decoding operation was successful by performing a CRC check in block 850. If the CRC check is successful, SS 116 returns to record the information in the decoded unicast message in block 815. If the CRC check is not successful, SS 116 determines, in block 855, if the EI type message has been detected, that is, determines if the EI_Encountered value is set to "True." If the EI type message has not been encountered, that is the EI_Encountered value is set to "False," SS 116 returns to record the information in the decoded unicast message in block 815. If the EI type message has been encountered, that is the EI_Encountered value is set to "False," SS 116 terminates the blind decoding process in block 860. Accordingly, after the unicast message CRC is successful in a sub-region, SS 116 decodes until the end of the sub-region and may not decode following sub-regions. Additionally, since all unicast messages for SS 116 are arranged contiguously, and since the message of type EI has already been encountered, no further unicast messages for SS 116 in the sub-region exist.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a subscriber station configured to communicate with at least one base station in the wireless communication network, the subscriber station comprising:
   a plurality of antennas; and
   a controller coupled to the plurality of antennas and configured to control the plurality of antennas to receive a plurality of resource allocation messages included in at least one resource allocation region, the at least one resource allocation region partitioned into a plurality of sub-regions, wherein a first sub-region includes at least one of the plurality of resource allocation messages, each of the plurality of resource allocation messages having a same size and a common modulation and coding scheme (MCS), and
   wherein the controller is configured to blind decode the at least one of the resource allocation messages without testing multiple resource allocation sizes or different MCS hypotheses and cease the blind decoding at the end of the first sub-region.

2. The subscriber station as set forth in claim 1, wherein a first of the at least one resource allocation message includes a unicast message directed solely to the subscriber station.

3. The subscriber station as set forth in claim 2, wherein the at least one unicast resource allocation message comprises a plurality of unicast resource allocation messages, all the unicast resource allocation messages directed to the subscriber station occur in a single sub-region of the resource allocation region.

4. The subscriber station as set forth in claim 2, wherein the controller is configured to perform, for each sub-region, an iterative blind decoding process for the sub-regions in the resource allocation region starting from a beginning of the resource allocation region, the iterative blind decoding process comprising, starting from the beginning of each sub-region:
   selecting a next block in each sub-region, the next block comprising a next resource allocation message;
   decoding the next resource allocation message;
   performing a cyclic redundancy check on the next resource allocation message, and recording the information when the cyclic redundancy check is successful;
   ceasing the iterative blind decoding process when the controller determines that an end of the sub-region has been reached and the at least one resource allocation message has been successfully decoded in the sub-region;
   selecting the next sub-region and continuing the iterative blind decoding process when the controller determines that an end of the sub-region has been reached and no resource allocation message has been successfully blind decoded in the sub-region; and
   ceasing the iterative blind decoding process when the controller determines that the end of the resource allocation region has been reached.

5. The subscriber station as set forth in claim 2, wherein a second one of the at least one resource allocation message includes a multicast message directed to a plurality of subscriber stations.

6. The subscriber station as set forth in claim 5, wherein the multicast message comprises a plurality of multicast messages, the plurality of multicast messages configured to occupy contiguous portions of the sub-region starting at a beginning of the sub-region such that each one of a plurality of the multicast messages occurs in a multicast region of the sub-region prior to the unicast message contained in a unicast region of the sub-region.

7. The subscriber station as set forth in claim 5, wherein the multicast message comprises a plurality of multicast messages to occupy a contiguous region starting from the beginning of the resource allocation region such that each one of the plurality of the multicast messages occurs prior to the unicast resource allocation message contained in the resource allocation region.

8. The subscriber station as set forth in claim 2, wherein the unicast message comprises a plurality of unicast messages, the plurality of unicast messages directed to the subscriber station that are arranged contiguously in the sub-region.

9. The subscriber station as set forth in claim 8, wherein the controller is configured to identify an End Indicator unicast message that corresponds to a last one of the unicast messages.

10. For use in a wireless communication network, a base station configured to communicate with at least one subscriber station in the wireless network, the base station comprising:
    a plurality of antennas; and
    a controller coupled to the plurality of antennas and configured to control the plurality of antennas to transmit a plurality of resource allocation messages included in a resource allocation region, the resource allocation region partitioned into a plurality of sub-regions, wherein a first sub-region includes at least one of the plurality of resource allocation messages, each of the plurality of resource allocation messages having a same size and a common modulation and coding scheme (MCS),
    wherein the subscriber station is configured to blind decode the first sub-region without testing multiple resource allocation sizes or different MCS hypotheses and cease blind decoding at the end of the first sub-region.

11. The base station as set forth in claim 10, wherein a first of the at least one resource allocation message includes a unicast message directed solely to one of the at least one subscriber station.

12. The base station as set forth in claim 11, wherein the unicast message comprises a plurality of unicast messages, all the unicast messages directed to the one of the at least one subscriber station occur in a single sub-region of the resource allocation region.

13. The base station as set forth in claim 11, wherein the unicast message comprises a plurality of unicast messages, the plurality of unicast messages directed to the one of the at least one subscriber station are arranged contiguously in the sub-region.

14. The base station as set forth in claim 13, wherein the controller is configured to transmit an End Indicator unicast message that corresponds to a last one of the unicast messages.

15. The base station as set forth in claim 10, wherein a second one of the at least one resource allocation message includes a multicast message directed to the at least one subscriber station.

16. The base station as set forth in claim 10, wherein the controller is configured to transmit a plurality of multicast messages in a multicast region of the sub-region and a plurality of unicast messages in a unicast region of the sub-region, and wherein the multicast region occurs prior to the unicast region.

17. The base station as set forth in claim 10, wherein the controller is configured to transmit a plurality of multicast messages in a multicast region of the resource allocation region and a plurality of unicast messages in a unicast region of the resource allocation region, and
    wherein the multicast region occurs prior to the unicast region.

18. For use in a wireless communication network, a method for communicating with at least one base station in the wireless network, the method comprising:
    receiving, by a subscriber station, a plurality of resource allocation messages included in a resource allocation region, the resource allocation region partitioned into a plurality of sub-regions, wherein a first sub-region includes at least one of the plurality of resource allocation messages, the plurality of resource allocation messages having a same size and a common modulation and coding scheme (MCS),
    blind decoding the at least one of the resource allocation messages in the first sub-region without testing multiple resource allocation sizes or different MCS hypotheses; and
    terminating the blind decoding at the end of the first sub-region.

19. The method as set forth in claim 18, wherein a first of the at least one resource allocation message includes a unicast message directed solely to the subscriber station.

20. The method as set forth by claim 19, wherein the unicast message comprises a plurality of unicast messages, all of the plurality of unicast messages directed to the subscriber station occur in a single sub-region of the resource allocation region.

21. The method as set forth in claim 19, further comprising performing, for each sub-region, an iterative blind decoding process for the sub-regions in the resource allocation region starting from a beginning of the resource allocation region, wherein performing the iterative blind decoding comprises and starting from the beginning of each sub-region:
    selecting a next block in the sub-region, the next block comprising a next resource allocation message;
    decoding the next resource allocation message;
    performing a cyclic redundancy check on the next resource allocation message, and recording the information when the cyclic redundancy check is successful;
    ceasing the iterative blind decoding process when the controller determines that an end of the sub-region has been reached and the at least one resource allocation message has been successfully decoded in the sub-region;
    selecting the next sub-region and continuing the iterative blind decoding process when the controller determines that an end of the sub-region has been reached and no resource allocation message has been successfully blind decoded in the sub-region; and
    ceasing the iterative blind decoding process when the controller determines that the end of the resource allocation region has been reached.

22. The method as set forth in claim 19, wherein a plurality of unicast messages directed to the subscriber station are arranged contiguously in the sub-region.

23. The method as set forth in claim 22, wherein the method further comprises:
    identifying an End Indicator (EI) unicast message that corresponds to a last one of the unicast messages.

24. The method as set forth in claim 18, wherein a second one of the at least one resource allocation message includes a multicast message directed to a plurality of subscriber stations.

25. The method as set forth in claim 18, wherein the multicast message comprises a plurality of multicast messages, the plurality of multicast messages configured to occupy contiguous portions of the sub-region starting at a beginning of the sub-region such that each one of a plurality of the multicast messages occurs in a multicast region of the sub-region prior to the unicast message contained in a unicast region of the sub-region.

26. The method as set forth in claim 18, wherein the multicast message comprises a plurality of multicast messages, the plurality of multicast resource allocation messages configured to occupy a contiguous region starting from the beginning of the resource allocation region such that each one of the plurality of the multicast resource allocation messages occurs prior to the unicast resource allocation message contained in the resource allocation region.

27. For use in a wireless communication network, a method for communicating with at least one subscriber station in the wireless network, the method comprising:
   transmitting, by a base station, a plurality of resource allocation messages included in a resource allocation region, the resource allocation region partitioned into a plurality of sub-regions, wherein a first sub-region includes the at least one of the resource allocation messages, the resource allocation messages having a same size and a common modulation and coding scheme (MCS), and
   blind decoding, by one of the at least one subscriber station, the first sub-region without testing multiple resource allocation sizes or different MCS hypotheses and cease blind decoding at the end of the first sub-region.

28. The method as set forth in claim 27, wherein the transmitting further comprises transmitting a first of the at least one resource allocation message as a unicast message directed solely to the one of the at least one subscriber station.

29. The method as set forth by claim 28, wherein the transmitting further comprises transmitting all the unicast messages directed to the one of the at least one subscriber station in a single sub-region of the resource allocation region.

30. The method as set forth in claim 29, wherein the transmitting further comprises arranging the plurality of unicast messages directed solely to the one of the at least one subscriber station contiguously in the sub-region.

31. The method as set forth in claim 30, wherein the transmitting further comprises transmitting an End Indicator unicast message that corresponds to a last one of the plurality of unicast messages.

32. The method as set forth in claim 27, wherein the transmitting further comprises transmitting a second one of the at least one resource allocation message as a multicast message directed to the at least one subscriber station.

33. The method as set forth in claim 27, wherein the transmitting further comprises:
   transmitting a plurality of multicast messages in a multicast region of the sub-region; and
   transmitting a plurality of unicast messages in a unicast region of the sub-region, wherein the multicast region occurs prior to the unicast region.

34. The method as set forth in claim 27, wherein the transmitting further comprises:
   transmitting a plurality of multicast messages in a multicast region of the resource allocation region; and
   transmitting a plurality of unicast messages in a unicast region of the resource allocation region, wherein the multicast region occurs prior to the unicast region.

\* \* \* \* \*